United States Patent
Syu et al.

(10) Patent No.: US 10,698,536 B2
(45) Date of Patent: Jun. 30, 2020

(54) METHOD OF DETECTING TOUCH POSITION AND TOUCH APPARATUS THEREOF

(71) Applicant: Wistron Corporation, New Taipei (TW)

(72) Inventors: You-Jyun Syu, New Taipei (TW);
Ching-An Cho, New Taipei (TW);
Kuo-Ting Huang, New Taipei (TW);
Yu-Yen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/261,599

(22) Filed: Jan. 30, 2019

(65) Prior Publication Data

US 2019/0155454 A1 May 23, 2019

Related U.S. Application Data

(63) Continuation-in-part of application No. 14/944,234, filed on Nov. 18, 2015, now abandoned.

(30) Foreign Application Priority Data

Jul. 8, 2015 (TW) .............................. 104122093 A

(51) Int. Cl.
*G06F 3/042* (2006.01)
*G06F 3/041* (2006.01)

(52) U.S. Cl.
CPC .......... *G06F 3/0428* (2013.01); *G06F 3/0416* (2013.01); *G06F 3/0418* (2013.01); *G06F 2203/04104* (2013.01)

(58) Field of Classification Search
None
See application file for complete search history.

(56) References Cited

U.S. PATENT DOCUMENTS

| | | | |
|---|---|---|---|
| 8,723,839 B2* | 5/2014 | Drumm ................. | G06F 3/0421 345/175 |
| 8,963,884 B2* | 2/2015 | Chen ...................... | G06F 3/042 345/173 |

(Continued)

FOREIGN PATENT DOCUMENTS

| | | |
|---|---|---|
| CN | 104160366 | 11/2014 |
| CN | 104246672 | 12/2014 |
| TW | 201435685 | 9/2014 |

OTHER PUBLICATIONS

"Office Action of China Counterpart Application", dated Sep. 29, 2018, p. 1-p. 9.

*Primary Examiner* — Dorothy Harris
(74) *Attorney, Agent, or Firm* — JCIPRNET

(57) ABSTRACT

A method for detecting multiple touch positions on a touch surface, which is applicable to a touch apparatus having multiple optical sensing modules, where each optical sensing module includes at least two optical sensing devices. The method includes: acquiring multiple pieces of sense information; determining multiple touch ranges for each piece of sense information; determining multiple points of intersection; selecting one of the pieces of sense information of which the touch ranges are used to calculate a greatest numbers of the points of intersection; for each touch range of the selected sense information, repeatedly selecting two of the points of intersection calculated using the corresponding touch range according to distances until the selected two points of intersection are verified as being located within the touch ranges of at least another one piece of sense information other than the selected sense information; and calculating the touch positions as actual touch positions according to the selected points of intersection when the selected points of intersection are verified as being located within the touch (Continued)

ranges of the at least another one piece of sense information other than the selected sense information.

8 Claims, 6 Drawing Sheets

(56) References Cited

U.S. PATENT DOCUMENTS

| | | | | |
|---|---|---|---|---|
| 2006/0202974 | A1* | 9/2006 | Thielman | G06F 3/0421 345/175 |
| 2009/0066662 | A1* | 3/2009 | Liu | G06F 3/0416 345/173 |
| 2011/0205189 | A1* | 8/2011 | Newton | G06F 3/0428 345/175 |
| 2011/0304590 | A1* | 12/2011 | Su | G06F 3/0418 345/175 |
| 2013/0135259 | A1 | 5/2013 | King et al. | |
| 2014/0146249 | A1* | 5/2014 | Holmgren | G06F 3/0421 349/12 |
| 2015/0002470 | A1 | 1/2015 | Zhu et al. | |
| 2015/0042582 | A1 | 2/2015 | An et al. | |

* cited by examiner

METHOD OF DETECTING TOUCH POSITION AND TOUCH APPARATUS THEREOF

CROSS-REFERENCE TO RELATED APPLICATION

This application is a continuation-in-part application of and claims the priority benefit of a prior application Ser. No. 14/944,234 filed on Nov. 18, 2015, now pending, which claims the priority benefit of Taiwan application serial no. 104122093, filed on Jul. 8, 2015. The entirety of each of the above-mentioned patent applications is hereby incorporated by reference herein and made a part of this specification.

BACKGROUND

Field of the Invention

The invention is directed to a detecting method and an apparatus related thereto and more particularly, to a method of detecting a touch position and a touch apparatus thereof.

Description of Related Art

Electronic devices or display screens having a touch function have gradually become a development trend of today's technology, and by means of the touch function, users can control the electronic apparatuses and the display screens or perform an input operation on the electronic apparatuses and the display screens. Based on the different design principles, the touch function is implemented by means of an optical touch module, a capacitive type touch module or a resistive type touch module.

Generally, a typical optical touch module is composed of two lenses. The lenses observe a touch object from different positions and then, calculate touched points based on obtained touch information, and thereby, a touch position of the touch object is obtained. In a case where a single touch object is detected, the two lenses of the optical touch module respectively outputs the obtained touch information, and touched points may be correctly obtained through cross-comparing the touch information. However, in a case where a plurality of touch objects is detected, substantially in existent touched points (i.e., so-called ghost points) may be generated during the cross-comparing process merely according to the touch information obtained by the two lenses of the single optical touch module.

In order to prevent the ghost points from affecting the operation of the touch function, a solution is to detect the touch positions of the touch objects by using a plurality of optical touch modules, such that the optical touch modules in different directions may be capable of detecting the matched touched points for the touch positions where the touch objects are located. In other words, actually existent touched points and the ghost points can be distinguished by comparing the touched points obtained by different optical touch modules. However, in actual operation, due to difference in resolutions and disposition positions of the lenses, positional deviations may occur in the touched points, even though corresponding to the touch positions of the touch objects, obtained by the optical touch module in different directions. In this case, the touch positions of the touch objects cannot be correctly determined by means of comparing.

SUMMARY

The invention provides a method for detecting touch positions on a touch surface and a touch apparatus thereof capable of effectively determining substantially existent touched points and filtering out ghost points, so as to correctly detect touch positions where a touch object is located on the touch surface.

According to an embodiment of the invention, a method for detecting a plurality of touch positions on a touch surface is applicable to a touch apparatus having a plurality of optical sensing modules, where each optical sensing module includes two optical sensing devices. The method includes the following steps: acquiring a plurality of pieces of sense information by the optical sensing modules, where each optical sensing device acquires one of the pieces of sense information; determining a plurality of touch ranges on the touch surface for each piece of sense information; determining a plurality of points of intersection on the touch surface by calculating each point of intersection using the touch ranges of two pieces of sense information of one of the optical sensing modules; selecting one of the pieces of sense information of which the touch ranges are used to calculate a greatest numbers of the points of intersection; for each touch range of the selected sense information, repeatedly selecting two of the points of intersection calculated using the corresponding touch range according to distances until the selected two points of intersection are verified as being located within the touch ranges of at least another one piece of sense information other than the selected sense information; and calculating the touch positions on the touch surface as actual touch positions according to the selected points of intersection when the selected points of intersection are verified as being located within the touch ranges of the at least another one piece of sense information other than the selected sense information.

According to another embodiment of the invention, a touch apparatus includes a plurality of optical sensing modules and a processor coupled to the optical sensing modules. The optical sensing modules are disposed around a touch surface, and each optical sensing module comprises two optical sensing device. The processor is configured to detect a plurality of touch positions on the touch surface. To be specific, the processor is configured to: acquire a plurality of pieces of sense information by the optical sensing modules, where each optical sensing device acquires one of the pieces of sense information; determine a plurality of touch ranges on the touch surface for each piece of sense information; determine a plurality of points of intersection on the touch surface by calculating each point of intersection using the touch ranges of two pieces of sense information of one of the optical sensing modules; select one of the pieces of sense information of which the touch ranges are used to calculate a greatest numbers of the points of intersection; for each touch range of the selected sense information, repeatedly select two of the points of intersection calculated using the corresponding touch range according to distances until the selected two points of intersection are verified as being located within the touch ranges of at least another one piece of sense information other than the selected sense information; and calculate the touch positions on the touch surface according to the selected points of intersection when the selected points of intersection are verified as being located within the touch ranges of the at least another one piece of sense information other than the selected sense information.

To sum up, in the touch position detecting method and the touch apparatus thereof provided by the embodiments of the invention, a plurality of pieces of sense information is obtained by the at least three optical sensing devices, and the touch positions on the touch surface can be derived from the pieces of sense information. By using the method and touch apparatus, ghost points can be correctly filtered and the touch positions can be correctly determined when a touch object has a certain width as such the touch points determined by only two optical sensing devices are not reliable.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
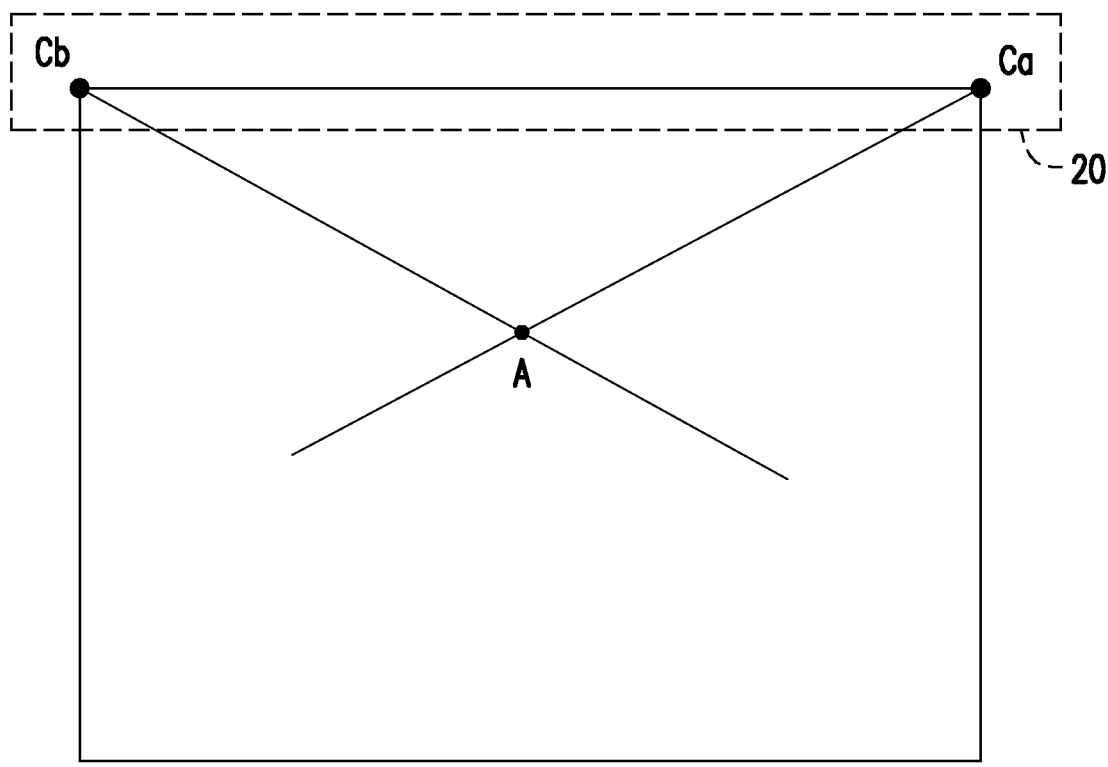
FIG. 1A, FIG. 1A', FIG. 1B, FIG. 1C, FIG. 1D and FIG. 1D' are respectively schematic views illustrating operations of an optical touch module.
Figure 1A:
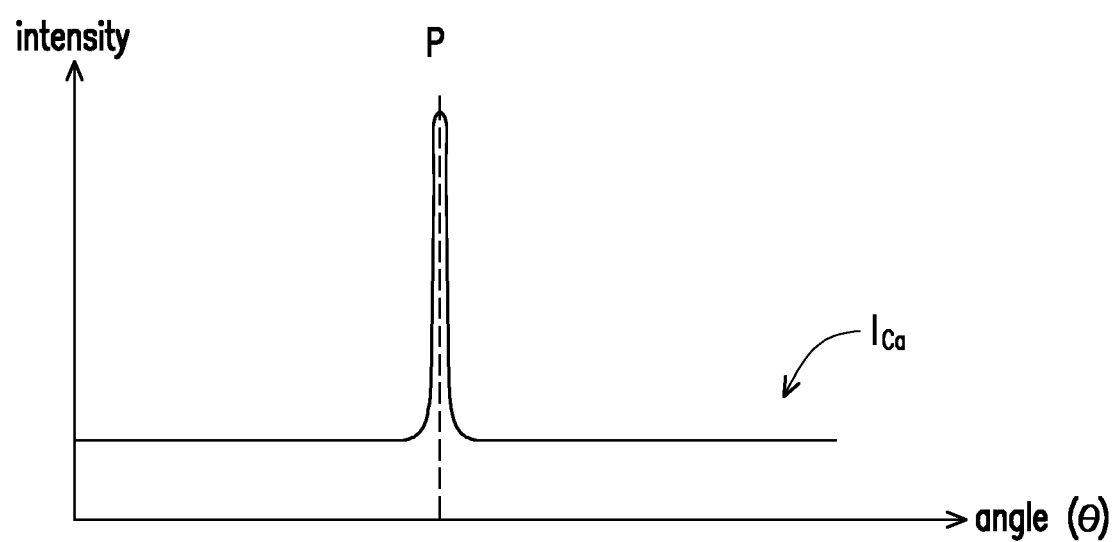

In an optical touch apparatus, ghost points have to be filtered out if touch positions of a plurality of touch objects are desired to be deduced and obtained. Specially, the ghost points are generated usually due to operations of the optical touch apparatus. FIG. 1A, FIG. 1A', FIG. 1B, FIG. 1C, FIG. 1D and FIG. 1D' are respectively schematic views illustrating operations of an optical touch apparatus.

Referring to FIG. 1A, an optical touch apparatus 10 includes, for example, two optical sensing devices Ca and Cb, and the optical sensing devices Ca and Cb further form an optical sensing module 20. The optical sensing devices Ca and Cb may be optical lenses, for example, each capable of capturing brightness images in front thereof to acquire sensing information.

Ideally, the width of the touch object is infinitely narrow, therefore lines extending from the optical sensing devices Ca and Cb to the touch object (intersection A) can be used to represent directions or angles of the touch object corresponding to the optical sensing devices Ca and Cb when the touch object is detected. Generally, in a reflective type optical touch apparatus, the lines represent high brightness peaks in each sensing information of the optical sensing devices Ca and Cb which are suddenly increased in brightness, while in a blocking type optical touch apparatus, the lines represent low brightness peaks in each sensing information of the optical sensing devices which are suddenly dropped in brightness. Referring to FIG. 1A', taking sense information $I_{ca}$ of the optical sensing device Ca as an example, the sense information $I_{ca}$ has an peak in brightness intensity (i.e., minimum for a blocking type optical touch apparatus or maximum for a reflective type optical touch apparatus) at angle p, and the angle p corresponds to the line extended from the optical sensing device Ca to the intersection A where the touch object is located shown in FIG. 1A. Lines extended from other optical sensing devices can be deduced by analogy.

As such, the touched position of the touch object may be calculated according to the sense information of the optical sensing devices Ca and Cb. To be specific, the actual touch position of the touch object can be determined as the intersection A of two lines extended from the optical sensing devices Ca and Cb by triangulation.

Figure 1B:
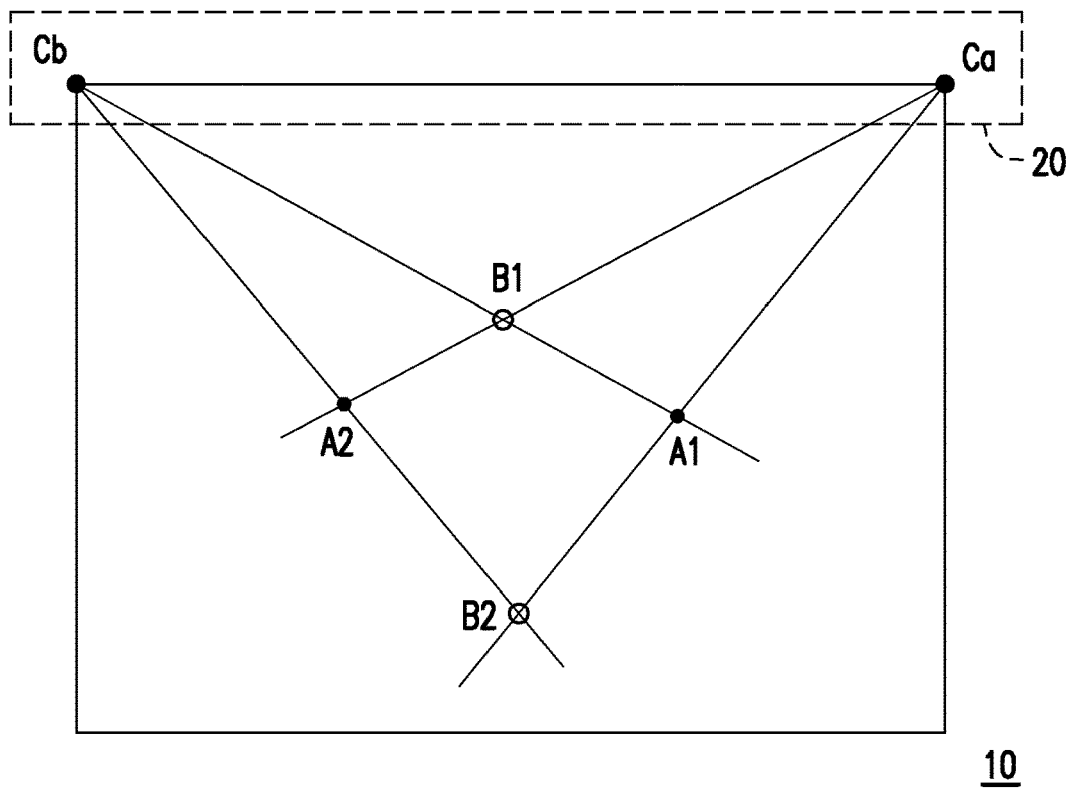

Nevertheless, referring to FIG. 1B, if multiple touch objects (e.g., two) appear at the same time, each of the sense information obtained by the two optical sensing devices Ca and Cb of the optical sensing module 20 may probably include multiple peaks. That is, multiple lines may be extended from each one of the optical sensing devices Ca and Cb due to multiple touch objects. As such, the number of intersections of the lines will be greater than actual touch positions of the touch objects. For example, there may be four intersections A1, A2, B1, and B2 whereas the touch objects are positioned at the intersections A1 and A2 only. The another two intersections B1 and B2 are so-called ghost points. However, it is more complicated to distinguish the actual touch positions and the ghost points from all the intersections for the optical sensing apparatus 10 with only one optical sensing module 20.

Figure 1C:
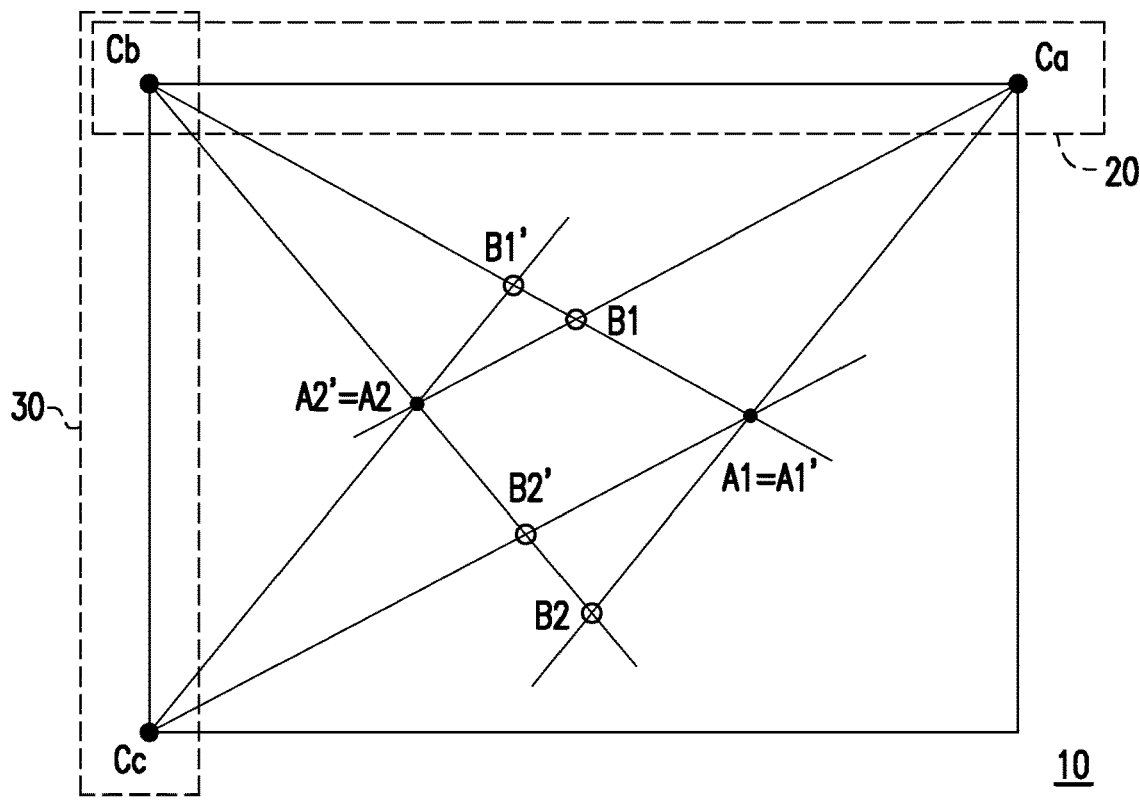

As described above, ghost points would cause malfunction in touch operations, and thus, it is important to filter out the ghost points. A common method is to filter out the ghost points by using multiple optical touch modules. Referring to FIG. 1C, the optical sensing module 20 includes the two optical sensing devices Ca and Cb, and an optical sensing module 30 includes two optical sensing devices Cb and Cc. As shown in FIG. 1C, four intersections A1, A2, B1 and B2 are calculated from the optical sensing module 20 and four intersections A1', A2', B1' and B2' are calculated from the optical sensing module 30. Since the touch objects may be detected by all the optical sensing devices Ca, Cb and Cc, the actual touch positions can be easily determined being at the intersections A1 and A2 which are overlap with the intersections A1' and A2', and the intersections B1, B2, B1' and B2' are determined as ghost points and filtered out.

Figure 1D:
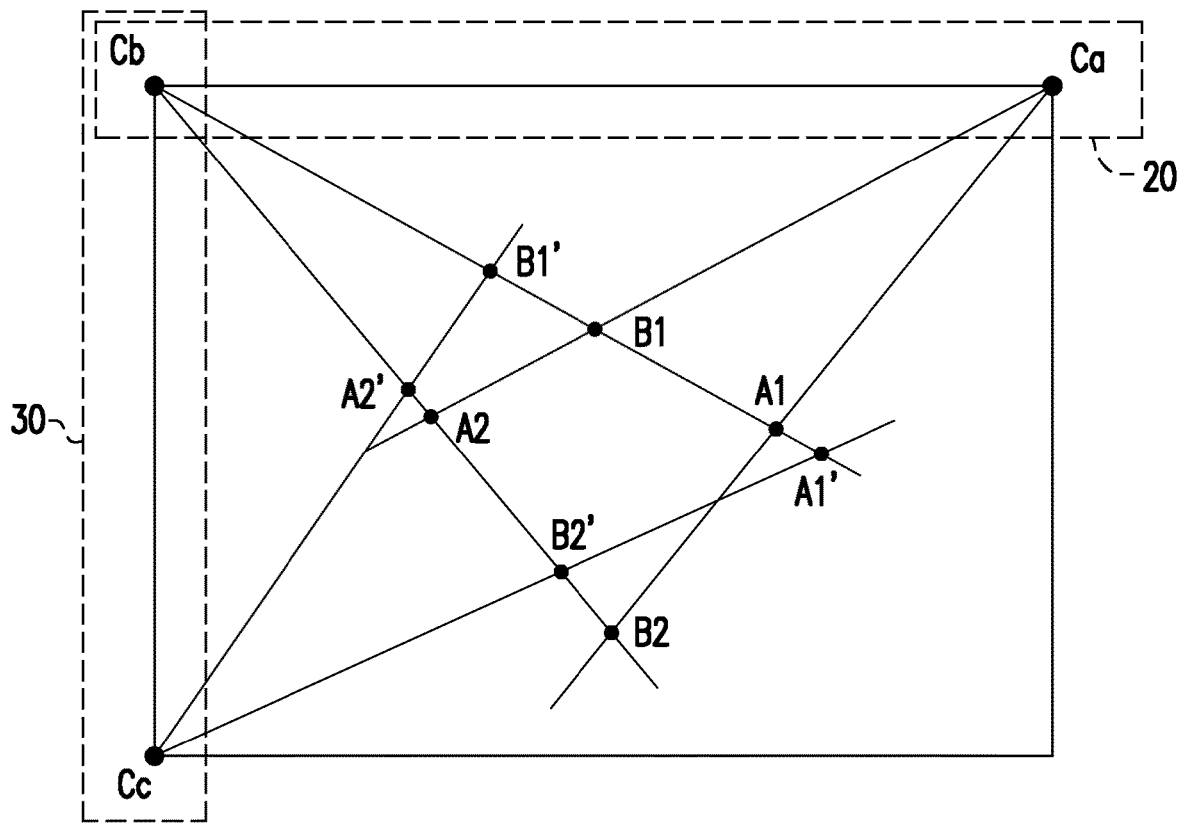
Figure 1D:
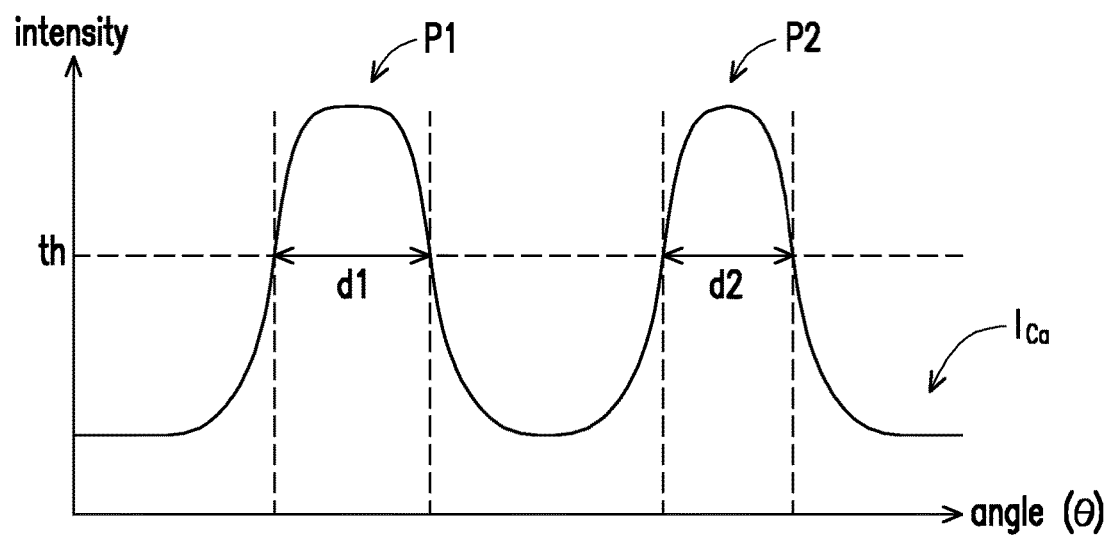

However, in actual use, the touch object has a certain volume or width, which means that the peak in the sense information is not as sharp as the ideal sense information $I_{ca}$ shown in FIG. 1A'. For example, the touch object may be a finger of a user and the width of the finger may look different from different angles. As shown in FIG. 1D', the sense information $I_{ca}$ has two peaks p1 and p2 of widths d1 and d2. In some cases, the two peaks as well as these widths d1 and d2 may be determined by a preset threshold th; in some other cases, these widths d1 and d2 may be a full width at half maximum (FWHM) of the peaks p1 and p2 in the sense information $I_{Ca}$. For calculating the intersections as said before, lines extended from one of the optical sensing devices Ca, Cb and Cc may be set corresponding to the center of the widths d1 and d2, the maximum value of the peaks p1 and p2, or any other points within the widths d1 and d2 of the peaks p1 and p2. Consequently, the intersections A1, A2, B1 and B2 calculated from the optical sensing module 20 and the intersections A1', A2', B1' and B2' calculated from the optical sensing module 30 may not have any overlap as shown in FIG. 1D. While in another case, the arrangement of each the optical sensing device may be affected by resolution, field of view, and assembly offsets, such that the touch positions measured by different optical sensing devices would essentially lead to deviations. Referring to FIG. 1D, even for the actually existent touch positions of the touch objects, the intersections A1 and A2 obtained by the optical touch module 20 have positional deviations from the intersections A1' and A2' obtained by the optical touch module 30. In both cases above, the actual touch positions accordingly may not be determined accurately and the ghost points may also not be correctly recognized nor filtered.

Figure 2:
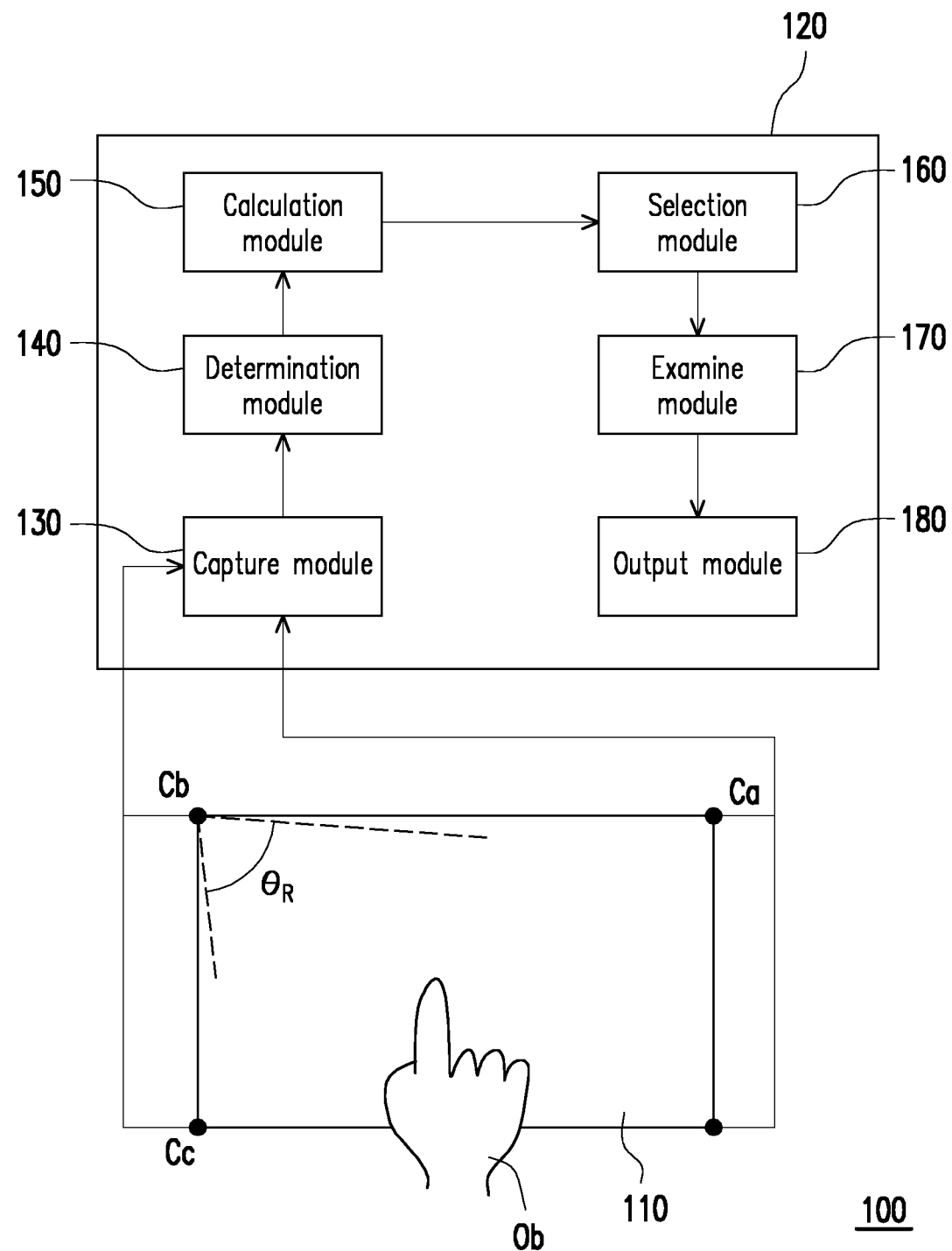
FIG. 2 is a schematic view illustrating a touch apparatus according to an embodiment of the invention.

FIG. 2 is a schematic view illustrating a touch apparatus according to an embodiment of the invention. Referring to FIG. 2, a touch apparatus 100 is, for example, an optical touch panel or an optical touch screen, which may be disposed in an electronic apparatus, such as a desktop computer, a notebook computer, a smart mobile apparatus, a display, a television, an advertising billboard, an electronic whiteboard, and configured to provide a touch function. The touch apparatus 100 has a touch surface 110. A touch object Ob may touch or floating-touch the touch surface 110 and move on the touch surface 110 to control the aforementioned electronic apparatus. In some embodiments, the touch surface 110 of the touch apparatus 100 may be integrated with a display device (not shown) to provide image information. The display device may be, for example, a liquid crystal display (LCD), a light-emitting diode (LED) display, a field emission display (FED), but the invention is not limited thereto.

The touch apparatus 100 includes a plurality of optical sensing devices. In the present embodiment, three optical sensing devices Ca, Cb and Cc are, for example, optical lenses including photosensitive elements, such as charge coupled devices (CCD) or other complementary metal oxide semiconductors (CMOS). Referring to FIG. 2, the optical sensing devices Ca, Cb and Cc are disposed around the touch surface 110, such as at three of the four corners of the touch surface 110, but the invention is not limited thereto. In the embodiment, any two of the optical sensing devices Ca, Cb and Cc, can be selected to form an optical sensing module. In some embodiments, the optical sensing devices Ca and Cb form a optical sensing module, and the optical sensing devices Ca and Cc form another optical sensing module. In some embodiments, the optical sensing devices Cb and Cc form still another optical sensing module. The optical sensing devices Ca, Cb and Cc respectively perform image-capturing to obtain a plurality of pieces of sense information. An embodiment with three optical sensing devices will be provided for description for example; however, for persons with ordinary skill in the art, an embodiment with more than three optical sensing devices (four optical sensing devices disposed at four corners of the touch surface, for example) may satisfy the invention.

To be specific, the sense information generally includes brightness intensity information detected by the optical sensing devices Ca, Cb and Cc within detection ranges thereof, and a detection range of each of the optical sensing devices Ca, Cb and Cc may be, for example, an angle range of $\theta_R$ degrees. Taking the embodiment illustrated in FIG. 2 as an example, when one touch object Ob (e.g., finger) touches the touch surface 110, the sense information of each of the optical sensing devices Ca, Cb and Cc presents one peak with a certain width in corresponding angles, where the peak may be positive or negative, depending on whether the touch apparatus 100 is a reflective or a blocking type.

The touch apparatus 100 further includes a capture module 130, a determination module 140, a calculation module 150, a selection module 160, an examine module 170 and an output module 180 which are configured to receive the sense information captured by the optical sensing devices Ca, Cb and Cc and perform relative procedures to obtain a touch position of the touch object Ob. In the present embodiment, the capture module 130, the determination module 140, the calculation module 150, the selection module 160, the examine module 170 and the output module 180 are, for example, a plurality of software procedures performed by a processor 120. The processor 120 may be, for example, a programmable microprocessor, a digital signal processor (DSP), a programmable controller, application specific integrated circuits (ASIC), a programmable logic device (PLD) or the like. However, in other embodiments, the capture module 130, the determination module 140, the calculation module 150, the selection module 160, the examine module 170 and the output module 180 may also be implemented by a plurality of circuits.

Figure 3:
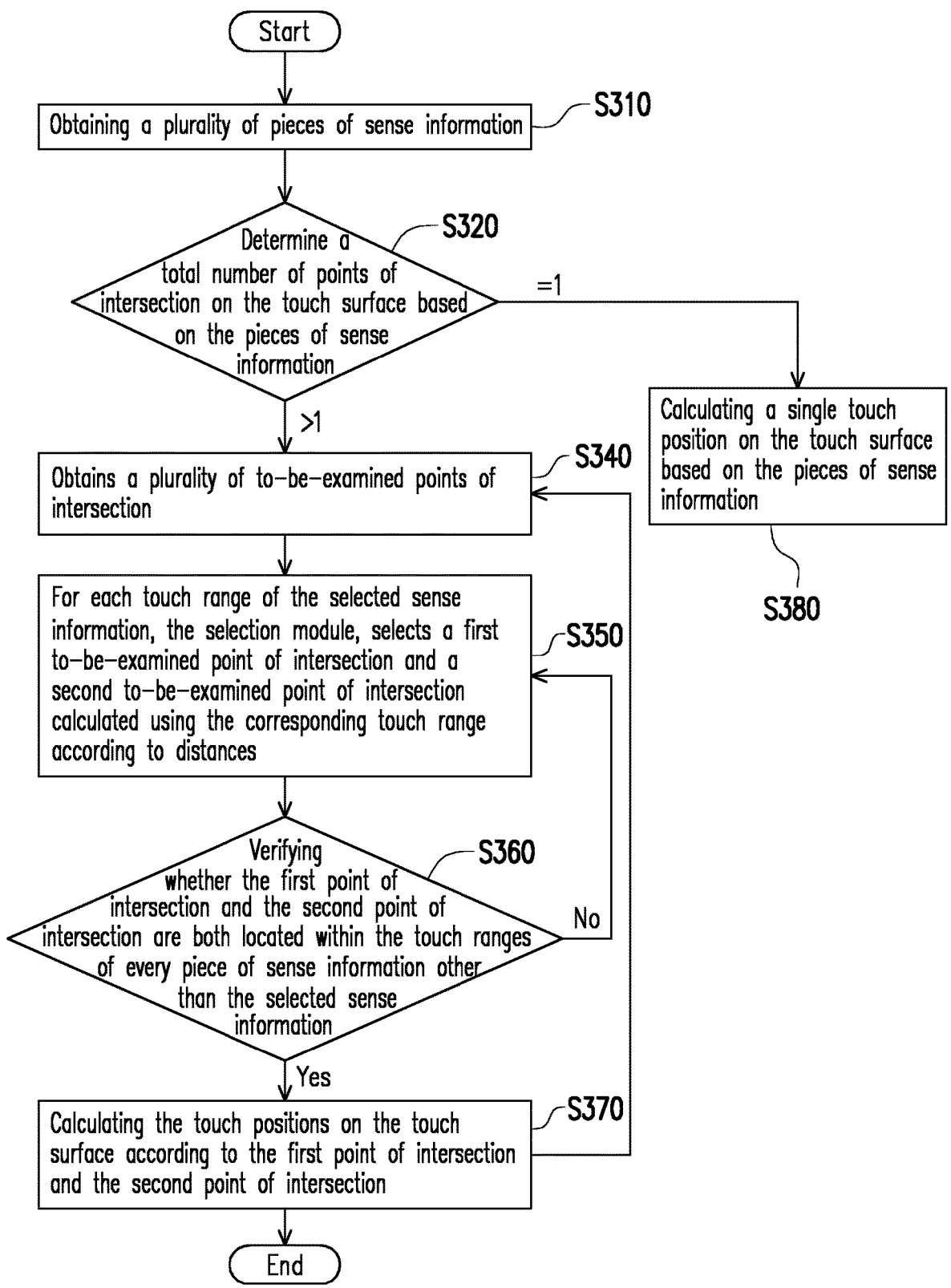
FIG. 3 is a flowchart illustrating a touch position detecting method according to an embodiment of the invention.

FIG. 3 is a flowchart illustrating a touch position detecting method according to an embodiment of the invention. The touch position detecting method of the present embodiment is applicable to the touch apparatus 100 illustrated in FIG. 2. Referring to FIG. 2 and FIG. 3, in step S310, the capture module 130 controls the optical sensing devices Ca, Cb and Cc to obtain a plurality of pieces of sense information. As described above, the sense information is the brightness intensity information detected by the optical sensing devices Ca, Cb and Cc within the detection ranges thereof. Generally, a peak of each of the sense information represents that there is a touch object in corresponding angles and a plurality of peaks represent possible existence of a plurality of touch objects.

In the embodiment, each of the optical sensing devices Ca, Cb and Cc acquires one of the pieces of sense information. Specifically, the optical sensing device Ca acquires one piece of sense information, the optical sensing device Cb acquires one piece of sense information, and the optical sensing device Cc acquires one piece of sense information.

Figure 4:
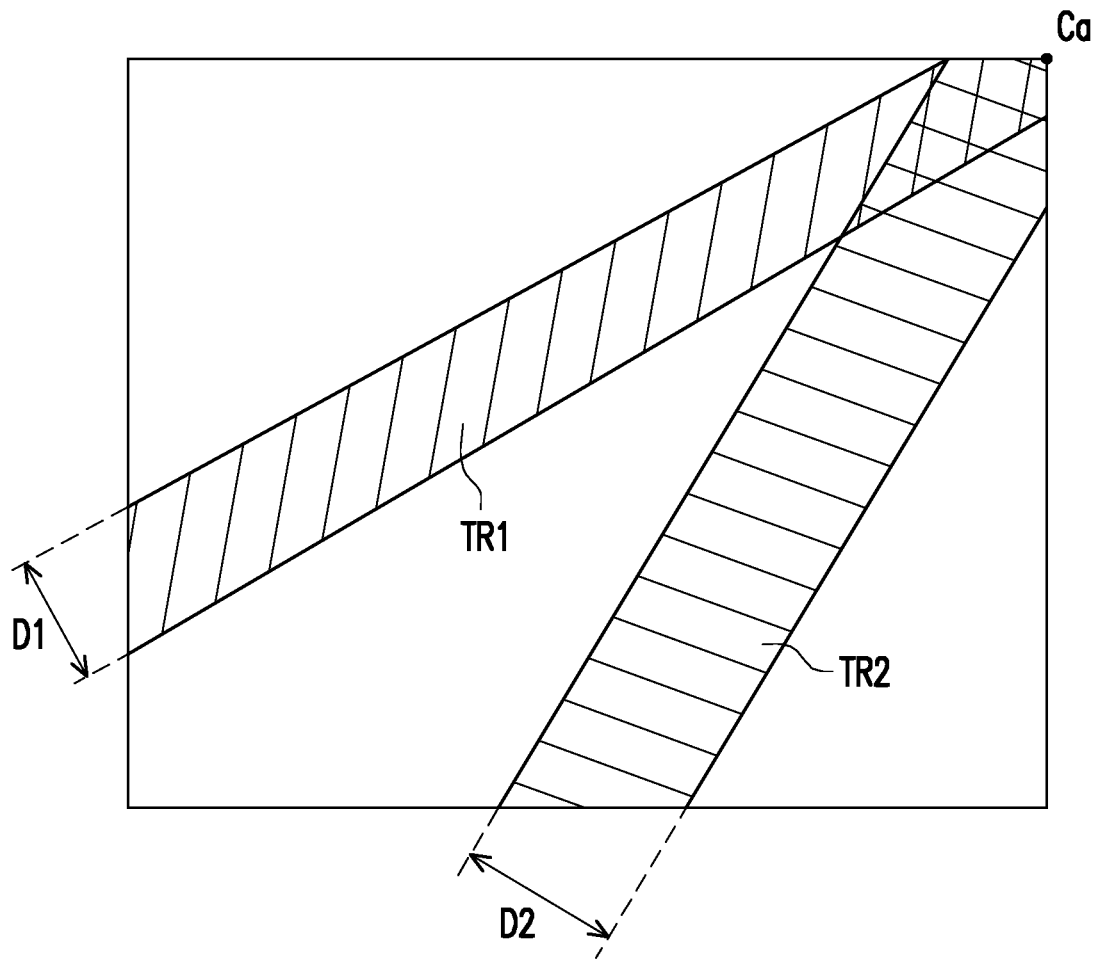
FIG. 4 is a schematic view illustrating touch ranges of sense information according to an embodiment of the invention.

In the embodiment, the processor 120 determines at least one touch range on the touch surface 110 for each piece of sense information. The touch range corresponds to the peak of the sense information. Referring to FIG. 1D' and FIG. 4, the touch ranges TR1 and TR2 on the touch surface corresponds to the peak of the sense information $I_{Ca}$, and the widths D1 and D2 of the touch ranges TR1 and TR2 corresponds to the widths d1 and d2 of the peaks p1 and p2 in the sense information $I_{Ca}$. By similar ways, when there is only one touch object, the processor 120 may determine one touch range for each piece of sense information; and when there are multiple touch objects, the processor 120 may determine multiple touch ranges for each piece of sense information.

Then, in step S320, the determination module 140 determines a total number of points of intersection on the touch surface 110 based on the pieces of sense information. To be detailed, the calculation module 150 calculates each point of intersection using the touch ranges of two pieces of sense information of one of the optical sensing modules. For example, for the optical sensing module including the optical sensing devices Ca and Cb, the calculation module 150 first determines the lines extended from the optical sensing device Ca and Cb, then calculates the point of intersection of the lines. For example, the upper line extended from the optical sensing device Ca shown in FIG. 1D is determined according to the touch range TR1 shown in FIG. 4, and the lower line extended from the optical sensing device Ca shown in FIG. 1D is determined according to the touch range TR2 shown in FIG. 4. Details of how the lines can be determined according to the sense information are described in the descriptions before, and which are not repeated herein. As such, all of the points of intersection can be obtained, and the determination module 140 may determine the total number of points of intersection according to the calculation result of the calculation module 150.

If the determination module 140 determines that the total number of the points of intersection on the touch surface 110 is equal to 1, as illustrated in FIG. 1A, which means that all lines extended from the optical sensing device Ca, Cb and Cc intersects at a same point. In this case, the touch position detecting method does not need to perform a step of determining and filtering out ghost points. In this case, in step S380, the calculation module 150 directly calculates a single touch position on the touch surface 110 based on the pieces of sense information, and the touch position may be used as the input of the electronic apparatus that provides the touch function.

In contrast, if the determination module 140 determines that the total number of the points of intersection is more than 1, as illustrated in FIG. 1D, in step S340, the selection module 160 obtains a plurality of to-be-examined points of intersection. Specifically, the selection module 160 selects one of the pieces of sense information of which the touch ranges are used to calculate a greatest numbers of the points of intersection, and the points of intersection calculated using the selected sense information are obtained as the to-be-examined points of intersection. In the embodiment, all of the touch positions on the touch surface 110 can be determined according to the to-be-examined points of intersection. Taking FIG. 1D as an example, four intersections A1, B2, B1 and A2 are calculated using the sense information of the optical sensing device Ca, eight intersections B1', B1, A1, A1', A2', A2, B2' and B2 are calculated using the sense information of the optical sensing device Cb, and four intersections A2', B1', B2' and A1' are calculated using the sense information of the optical sensing device Cc. As such, the sense information calculated using the sense information of the optical sensing device Cb is selected and the eight intersections B1', B1, A1, A1', A2', A2, B2' and B2 are obtained as the to-be-examined points of intersection.

Then, in step S350, for each touch range of the selected sense information, the selection module 160 selects a first to-be-examined point of intersection and a second to-be-examined point of intersection calculated using the corresponding touch range according to distances. In step S360, the examine module 170 verifies whether the first point of intersection and the second point of intersection are both located within the touch ranges of at least another one piece of sense information other than the selected sense information. If yes, the flow goes to step S370; otherwise, the flow goes back to step S350 to select a first to-be-examined point of intersection and a second to-be-examined point of intersection calculated using the corresponding touch range according to distances again, then verifies in step 360 again, until the first point of intersection and the second point of intersection selected are both located within the touch ranges of at least another one piece of sense information other than the selected sense information.

If two intersections are near to each other, it has a high chance that these two intersections indicate a same touch position. However, some experiences show that two intersections may be near when the two intersections are ghost points. Therefore, the step S360 is performed to exclude the ghost points that are near to each other. Specifically, an actual touch position should be detected by all of the optical sensing devices. If two intersections indicate the actual touch position, these two intersections are not far from the touch object or the actual touch position, and should locate within the touch ranges of every piece of sense information other than the selected sense information.

In step S370, the output module 180 calculates the touch positions on the touch surface 110 as actual touch positions according to the first point of intersection and the second point of intersection.

Taking FIG. 1D as an example, the sense information of the optical sensing device Cb is selected, and two touch ranges are determined for the sense information of the optical sensing device Cb. One of the touch range is used to calculate the points of intersection A2', A2, B2' and B2, and another of the touch range is used to calculate the points of intersection B1', B1, A1 and A1'.

For the touch range used to calculate the points of intersection A2', A2, B2' and B2, the selection module 160 selects two nearest points of intersection A2' and A2 first, then the examine module 170 verifies whether the two nearest points of intersection A2' and A2 are locate within the touch ranges of at least another one piece of sense information other than the selected sense information, that is, the touch ranges of the sense information of the optical sensing device Ca and the touch ranges of the sense information of the optical sensing device Cc. Taking the sense information $I_{Ca}$ of the optical sensing device Ca as an example, if the points of intersection A2' and A2 are both located within one of the touch ranges TR1 and TR2 of the sense information $I_{ca}$, it is determined that the points of intersection A2' and A2 are located within the touch ranges of the sense information $I_{Ca}$ of the optical sensing device Ca. Similarly, if the points of intersection A2' and A2 are both located within one of two touch ranges of the sense information of the optical sensing device Cc, it is determined that the points of intersection A2' and A2 are located within the touch ranges of the sense information of the optical sensing device Cc.

If the two nearest points of intersection A2' and A2 are verified as being located within the touch ranges of the sense information of the optical sensing device Ca and the touch ranges of the sense information of the optical sensing device Cc, the output module 180 calculates touch positions on the touch surface 110 according to the two nearest points of intersection A2' and A2. In some embodiment, the output module calculates a midpoint of the points of intersection A2' and A2 and takes the midpoint as one of the actual touch position. However, the method of calculating the touch position according to the two points of intersection is not limited in the invention.

If the two nearest points of intersection A2' and A2 are verified as not being located within the touch ranges of the sense information of the optical sensing device Ca or the touch ranges of the sense information of the optical sensing device Cc, the selection module 160, the selection module 160 ignores the two nearest points of intersection A2' and A2 but rather selects two second-nearest points of intersection B2' and B2 from the points of intersection A2', A2, B2' and B2. The flow then goes to step S360 of which the details have been mentioned before.

For the touch range used to calculate the points of intersection B1', B1, A1 and A1', the selection module 160, the examine module 170 and the output module perform similar operations in steps S350, S360 and S270 as mentioned before. As such, one of the actual touch position may be determined for each of the touch ranges of the selected sense information (e.g., the sense information of the optical sensing device Cb). In the present embodiment, there are two actual touch positions are determined. One of the actual touch position is calculated according to the points of intersection A2' and A2, and another of the actual touch position is calculated according to the points of intersection A1 and A1'. Therefore, points of intersection B1', B1, B2' and B2 can be recognized as ghost points and filtered.

To summarize, in the touch position detecting method and the touch apparatus thereof provided by the embodiments of the invention, a plurality of pieces of sense information is obtained by the at least three optical sensing devices, and the touch positions on the touch surface can be derived from the pieces of sense information. Accordingly, the touch position detecting method and the touch apparatus thereof can filter out the ghost points on the touch surface and accurately determine the touch positions of the touch objects, so as to achieve better touch detection.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for detecting a plurality of touch positions on a touch surface, applicable to a touch apparatus having a plurality of optical sensing modules, wherein each optical sensing module comprises at least two optical sensing devices, the method comprising:
   acquiring a plurality of pieces of sense information by the optical sensing modules, wherein each optical sensing device acquires one of the pieces of sense information;
   determining a plurality of touch ranges on the touch surface for each piece of sense information;
   determining a plurality of points of intersection on the touch surface by calculating each point of intersection using the touch ranges of two pieces of sense information of one of the optical sensing modules;
   selecting one of the pieces of sense information of which the touch ranges are used to calculate a greatest numbers of the points of intersection;
   for each touch range of the selected sense information, repeatedly selecting two of the points of intersection calculated using the corresponding touch range according to distances until the selected two points of intersection are verified as being located within the touch ranges of at least another one piece of sense information other than the selected sense information, comprising:
      selecting two nearest points of intersection from the points of intersection calculated using one of the touch ranges of the selected sense information; and
      verifying whether the two nearest points of intersection are located within the touch ranges of the at least another one piece of sense information other than the selected sense information, and in response to the verification that the two nearest points of intersection are verified as being located within the touch ranges of the at least another one piece of sense information other than the selected sense information, calculating a midpoint of the two nearest points of intersection as one of the touch positions.

2. The method according to claim 1, wherein all of the touch positions on the touch surface is calculated according to the points of intersection calculated using the touch ranges of the selected sense information.

3. A touch apparatus, comprising:
   a plurality of optical sensing modules, disposed around a touch surface, wherein each optical sensing module comprises at least two optical sensing devices; and
   a processor, coupled to the optical sensing modules and configured to detect a plurality of touch positions on the touch surface, comprising:
      acquiring a plurality of pieces of sense information through the optical sensing modules, wherein each optical sensing device acquires one of the pieces of sense information;
      determining a plurality of touch ranges on the touch surface for each piece of sense information;
      determining a plurality of points of intersection on the touch surface by calculating each point of intersection using the touch ranges of two pieces of sense information of one of the optical sensing modules;
      selecting one of the pieces of sense information of which the touch ranges are used to calculate a greatest numbers of the points of intersection;
      for each touch range of the selected sense information, repeatedly selecting two of the points of intersection calculated using the corresponding touch range according to distances until the selected two points of intersection are verified as being located within the touch ranges of at least another one piece of sense information other than the selected sense information, wherein
         the processor selects two nearest points of intersection from the points of intersection calculated using one of the touch ranges of the selected sense information, and verifies whether the two nearest points of intersection are located within the touch ranges of the at least another one piece of sense information other than the selected sense information, and in response to the verification that the two nearest points of intersection are verified as being located within the touch ranges of the at least another one piece of sense information other than the selected sense information, the processor calculates a midpoint of the two nearest points of intersection as one of the touch positions.

4. The apparatus according to claim 3, wherein the processor calculates all of the touch positions on the touch position according to the points of intersection calculated using the touch ranges of the selected sense information.

5. A method for detecting a plurality of touch positions on a touch surface, applicable to a touch apparatus having a plurality of optical sensing modules, wherein each optical sensing module comprises at least two optical sensing devices, the method comprising:
   acquiring a plurality of pieces of sense information by the optical sensing modules, wherein each optical sensing device acquires one of the pieces of sense information;
   determining a plurality of touch ranges on the touch surface for each piece of sense information;
   determining a plurality of points of intersection on the touch surface by calculating each point of intersection using the touch ranges of two pieces of sense information of one of the optical sensing modules;
   selecting one of the pieces of sense information of which the touch ranges are used to calculate a greatest numbers of the points of intersection;
   for each touch range of the selected sense information, repeatedly selecting two of the points of intersection calculated using the corresponding touch range according to distances until the selected two points of intersection are verified as being located within the touch ranges of at least another one piece of sense information other than the selected sense information, comprising:

selecting two nearest points of intersection from the points of intersection calculated using one of the touch ranges of the selected sense information, verifying whether the two nearest points of intersection are located within the touch ranges of the at least another one piece of sense information other than the selected sense information, and in response to the verification that the two nearest points of intersection are verified as being not located within the touch ranges of the at least another one piece of sense information other than the selected sense information, ignoring the two nearest points of intersection but rather selecting two second-nearest points of intersection from the points of intersection calculated using the one of the touch ranges of the selected sense information, and verifying whether the two second-nearest points of intersection are located within the touch ranges of at least another one of sense information other than the selected sense information; and calculating the touch positions on the touch surface as actual touch positions according to the selected two second-nearest points of intersection when the selected two second-nearest points of intersection are verified as being located within the touch ranges of the at least another one piece of sense information other than the selected sense information.

6. The method according to claim 5, wherein all of the touch positions on the touch surface is calculated according to the points of intersection calculated using the touch ranges of the selected sense information.

7. A touch apparatus, comprising:

a plurality of optical sensing modules, disposed around a touch surface, wherein each optical sensing module comprises at least two optical sensing devices; and a processor, coupled to the optical sensing modules and configured to detect a plurality of touch positions on the touch surface, comprising:

acquiring a plurality of pieces of sense information through the optical sensing modules, wherein each optical sensing device acquires one of the pieces of sense information;

determining a plurality of touch ranges on the touch surface for each piece of sense information;

determining a plurality of points of intersection on the touch surface by calculating each point of intersection using the touch ranges of two pieces of sense information of one of the optical sensing modules;

selecting one of the pieces of sense information of which the touch ranges are used to calculate a greatest numbers of the points of intersection;

for each touch range of the selected sense information, repeatedly selecting two of the points of intersection calculated using the corresponding touch range according to distances until the selected two points of intersection are verified as being located within the touch ranges of at least another one piece of sense information other than the selected sense information, wherein the processor selects two nearest points of intersection from the points of intersection calculated using one of the touch ranges of the selected sense information, verifies whether the two nearest points of intersection are located within the touch ranges of the at least another one piece of sense information other than the selected sense information, and in response to the verification that the two nearest points of intersection are not verified as being located within the touch ranges of the at least another one piece of sense information other than the selected sense information, the processor ignores the two nearest points of intersection but rather selects two second-nearest points of intersection from the points of intersection calculated using the one of the touch ranges of the selected sense information, and verifies whether the two second-nearest points of intersection are located within the touch ranges of at least another one piece of sense information other than the selected sense information; and calculating the touch positions on the touch surface as actual touch positions according to the selected two second-nearest points of intersection when the selected two second-nearest points of intersection are verified as being located within the touch ranges of the at least another one piece of sense information other than the selected sense information.

8. The apparatus according to claim 7, wherein the processor calculates all of the touch positions on the touch position according to the points of intersection calculated using the touch ranges of the selected sense information.

* * * * *